United States Patent Office 3,442,847
Patented May 6, 1969

3,442,847
POLYESTER RESIN WIRE COATING COMPOSITIONS
Lionel J. Payette, Scotia, N.Y., assignor to General Electric Company, a corporation of New York
No Drawing. Filed Oct. 10, 1966, Ser. No. 585,292
Int. Cl. C08g *17/08;* C08f *45/36, 45/34*
U.S. Cl. 260—33.4     5 Claims

ABSTRACT OF THE DISCLOSURE

Stable polyester resin based wire enamels having high solids contents are provided by heating the polyester-solvent system at reflux temperatures.

---

This invention relates to resinous coating compositions. More particularly, it relates to wire enamels and other coating compositions which are characterized by a relatively high solids content than normal along with good stability and coating properties.

Resinous coating compositions in the form of varnishes and enamels prepared by dissolving solid resinous contituents in compatible solvents are well known. When coating structures with such compositions, it is desirable to have therein as high a solids content as possible consistent with stability, coating qualities and other factors so that a maximum amount of coating material may be deposited in each pass of a wire or other structure through the coating composition or enamel.

Among the materials which have been widely used for insulating electrical structures, such as wires, as well as for general coating purposes are polyesters derived from a glycol, a polyhydric alcohol containing at least three hydroxyl groups and an alkyl phthalate or terephthalic acid. Such polyester materials are described in detail in Patent 2,936,296 assigned to the same assignee as the present invention, said patent being included herein by reference.

Briefly, the polyester resins useful in connection with the present invention comprise (a) from about 25 to 56 equivalent percent, preferably from 36 to 50 equivalent percent, of isophthalic or terephthalic acid or a lower dialkyl ester of such materials, and mixtures thereof; (b) from about 15 to 46 equivalent percent, preferably from about 25 to 40 equivalent percent, of ethylene glycol; and (c) from about 13 to 44 equivalent percent, preferably from 20 to 32 equivalent percent, of a saturated aliphatic polyhydric alcohol having at least three hydroxyl groups. Typical of the isophthalic and terephthalic acid esters which can be used are those dialkyl esters containing from one to eight, preferably from one to four, carbon atoms including dimethyl, diethyl, dipropyl, dibutyl, etc. esters. Typical polyhydric alcohols are glycerine, 1,1,1-trimethylolethane, sorbitol, mannitol, diglycerol, trimethylolpropane, dipentaerythritol, tris(2-hydroxyethyl) isocyanurate, etc. The ethylene glycol can be replaced in whole or in part by other diols including but not limited to butane-diol, neopentyl-diol, pentane-diol, and the like. The polyester can also be modified as with isocyanates and the like.

The term "equivalent percent" is used in its usual sense herein, it being the number of equivalents of the reactant divided by the total number of equivalents of all reactants times 100. The number of equivalents, then, is the number of moles of the reactant multiplied by the number of functional groups, such as carboxyl, ester, hydroxyl, isocyanate, etc. Thus, the equivalents of dimethylterephthalate is the number of moles of this material multiplied by two; for glycerine, the number of moles times three; and for ethylene glycol, the number of moles times two.

Typical of the polyesters along with the others described in the above patent which can be used in the practice of this invention is one prepared from 46 equivalent percent (three moles) dimethylterephthalate, 31 equivalent percent (two moles) ethylene glycol, and 23 equivalent percent (one mole) 95 percent glycerine.

Typically, in preparing the polyester, the materials are added along with xylene or other similar solvent to prevent sublimation of lower dialkyl esters of the acids to a three-necked flask having a thermometer, stirrer and Vigreaux column with a Dean & Stark trap and funnel on the column. A nitrogen blanket is also provided for the system. The system is heated for about thirty minutes, during which time the pot temperature rises to about 130° C. and the water xylene azotropically distill from the system. Then about 0.03 percent by weight of catalyst, such as lead acetate, which acts as an alcoholysis catalyst, is added, this material being based on the weight of the dimethylterephthalate, and heating is continued for about 3½ hours to a final temperature of about 240° C. For further details and methods of preparing the polyesters, reference should be made to the above patent.

The usual pigmenting materials are useful in connection with the present invention, it being kept in mind that where good electrical properties are required, they should be of an insulating character. Among the useful pigments included are iron oxides and the oxides of chromium, cobalt, cadmium, selenium, copper, titanium and manganese. The usual fillers employed in conjunction with resinous materials are also useful in the practice of this invention. Generally, where good electrical properties are required, fillers of a siliceous nature are preferred, including silicas, silicates, kaolin, clays, diatomaceous earths and carbon, among others. In some cases, the pigment serves a dual role as colorant and filler.

Polyester resins such as those described above can be cured or converted into the substantially infusible and insoluble state by heating at elevated temperatures of the order of about 200° C. to as high as 450° C. In order to accelerate the cure particularly at lower temperatures, various metal-containing curing catalysts have been employed including zinc octoate, cadmium octoate, organic titanate, and the like, as well as the various isocyanates including aromatic diisocyanate, aliphatic diisocyanate and the like.

Generally, when such materials are converted into coating or wire enamels, they are dissolved in a suitable solvent such as cresylic acid, xylenols, xylene, polyalkyl benzenes, high boiling petroleum hydrocarbons, polyhydroxy benzenes and the like to provide a solution containing from about 25 to 30% solids, it having been found that generally a higher solids content results in poor stability or shelf life, including an undesirable increase in viscosity.

A primary object of the present invention is to provide coating compositions, varnishes or enamels containing polyesters of the above type which contain a higher proportion than usual of solid materials.

Briefly, according to the invention, resinous coating compositions containing a higher than usual proportion of solids is prepared by adding to the resinous material a suitable solvent and thereafter equilibrating the resin-solvent mixture at its reflux temperature for times varying from about two hours to eight hours. It has been found that this equilibration unexpectedly provides high solids content coating compositions which are particularly stable or have good shelf life and at one and the same time are characterized by good coating compositions and final physical characteristics comparable to lower solids content compositions.

The enamel solvents used in connection with the present invention include those which are normally used in such a role, materials such as cresylic acid, xylene and high boiling petroleum solvents being particularly useful along with such materials as phenols. Among the hydrocarbon solvents are the so-called Solvesso materials manufactured by Humble Oil Company in various grades. Solvesso 100 is a mixture of meta-, di- and tri-alkyl (primarily methyl) benzenes having a flash point of about 113° F. and a distillation range of about 318° to 352° F. Solvesso 150 is another such high boiling petroleum hydrocarbon material consisting of a mixture of di-, tri- and tetra-alkyl (primarily methyl) benzenes having a flash point of about 151° F. and a distillation range of about 364° F. to 412° F. Another material of this type is one having a distillation range of from about 288° F. to 346° F.

The following are typical examples of the present invention, it being realized that they are not to be taken as limiting in any way and that various modifications and variations thereof may be made without departing from the concept of the invention.

There was prepared a polyester by mixing together 46 equivalent percent of dimethyl terephthalate, 31 equivalent percent of ethylene glycol and 23 equivalent percent of glycerine in the manner described above. This material in an amount to provide 40% solids with its usual curing agent was dissolved in a solvent consisting of by weight 65 parts of a 50—50 mixture of cresylic acid and phenol and 35 parts by weight of Solvesso 100 hydrocarbon solvent. This solution was then equilibrated for about four hours at its reflux temperature or at a temperature ranging from about 160° C. to 170° C.

When this material was applied to a 40 mil diameter copper wire, it was found that a build of three mils could be attained in four passes whereas with a 25 percent solids enamel of the same type which was not equilibrated, six passes were required to provide the same build. It was further found that the smoothness of the coating and other physical characteristics such as those described in Patent 2,936,296, including cut-through, heat shock, abrasion, flexibility and solvent resistance and the like were comparable to those of the lower solid content unequilibrated material.

It is also convenient in connection with the present invention to prepare modified polyesters of the above type, the modifying agents being added to and reacted with the polyester resin constituent during the equilibration process. For example, it has been found that polyisocyanate material can be added to the solvent mixture in desired amount to provide improved characteristics such as resistance to thermal degradation of overcoat such as those of nylon or polyethylene terephthalate. Thus, there was prepared a polyester resin in the above manner using by weight 25.2 parts of a mixture of iso- and terephthalic acid, 6.78 parts ethylene glycol and about 6.98 parts of glycerine. There was prepared from this polyester a 40 percent solids solution using as the solvent about 17.1 parts of cresylic acid, 17.1 parts phenol and 19.3 parts of the above hydrocarbon solvent having a distillation range of from about 288° F. to 346° F. There was added to the mixture along with a suitable curing agent about 1.7 parts of a polyisocyanate material which is a phenol blocked reaction product of trimethylol propane and tolylene diisocyanate, such material being known as Trancoa 3A and manufactured by the Trancoa Chemical Corporation. When this material was refluxed for four hours at its reflux temperature or at a temperature of about 170° C., there resulted a material which when coated on copper wire in the usual manner was in every way equivalent to unequilibrated material but at the same time possessing the advantage of more ready application to a given thickness of material.

There are provided, then, by the present invention polyester based resin compositions which have a higher than normal solids content, which by reason of such characteristics are more readily and economically applied to structures to be coated. These materials are further possessed of good physical qualities and provide smooth and commercially acceptable coatings.

What I claim as new and desire to secure by Letters Patent of United States is:

1. The process of preparing a stable polyester base wire enamel where said polyester is the heat reaction product of (a) from about 25 to 56 equivalent percent of a material selected from isophthalic acid, terephthalic acid and lower dialkyl esters of such materials and mixtures thereof, (b) from about 15 to 46 equivalent percent of ethylene glycol, and (c) from about 13 to 44 equivalent percent of a saturated polyhydric alcohol having at least three hydroxyl groups, which comprises (1) adjusting to about 40 weight percent the solids content of a solvent solution of the polyester and (2) heating said solution at its reflux temperature at from about 2 hours to 8 hours 2. The process of claim 1 wherein said polyester is essentially the heat reaction product of 46 equivalent percent dimethyl terephthalate, 31 equivalent percent ethylene glycol and 23 equivalent percent glycerine 3. A process as in claim 1 wherein the solvent consists by weight essentially of about 65 percent of a 50/50 mixture of cresylic acid and phenol and about 35 percent of high boiling petroleum hydrocarbon.

4. A process as in claim 1 wherein there is added to the solution polyisocyanate material.

5. A process as in claim 1 wherein the polyester is the heat reaction product of by weight 25.2 parts of a mixture of isophthalic and terephthalic acids, 6.78 parts glycol and 6.98 parts glycerine, there being added to said composition 1.7 parts of polyisocyanate material and the solvent for which comprises 17.1 parts cresylic acid, 17.1 parts phenol and 19.3 parts of a high boiling petroleum hydrocarbon having a distillation range of about 288° F. to 346° F. and the time of heating the solution is about 4 hours.

References Cited

UNITED STATES PATENTS

| | | |
|---|---|---|
| 2,889,304 | 6/1959 | Sheffer et al. |
| 2,936,296 | 5/1960 | Precopio et al. _____ 260—33.6 |
| 3,009,896 | 11/1961 | Sattler et al. _____ 260—33.6 |

MORRIS LIEBMAN, *Primary Examiner.*

L. T. JACOBS, *Assistant Examiner.*

U.S. Cl. X.R.

260—33.6